C. H. LITTLE.
DRAFTING MACHINE.
APPLICATION FILED FEB. 10, 1905.
1,003,766.
Patented Sept. 19, 1911.
8 SHEETS—SHEET 4.
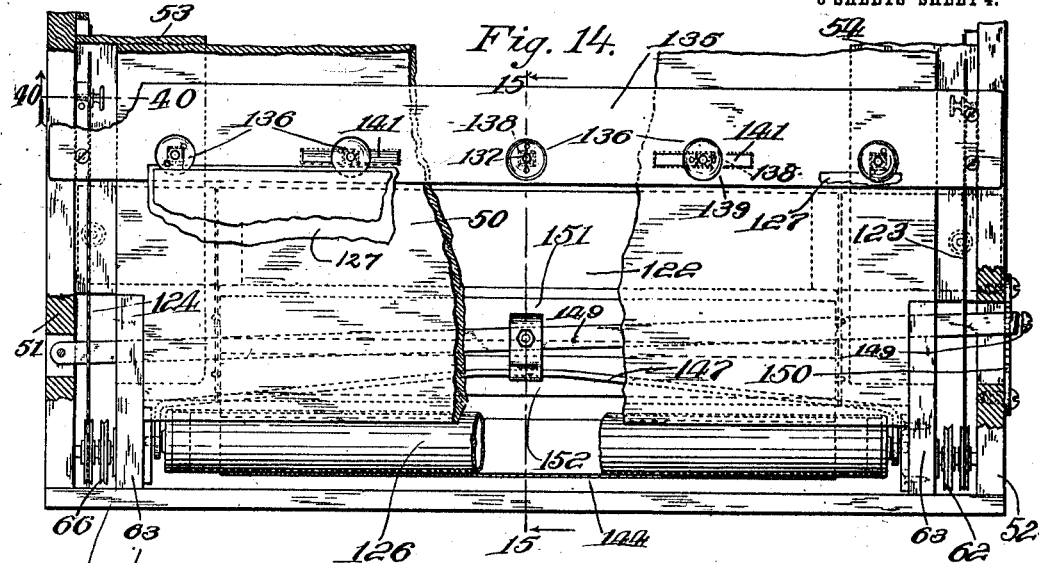
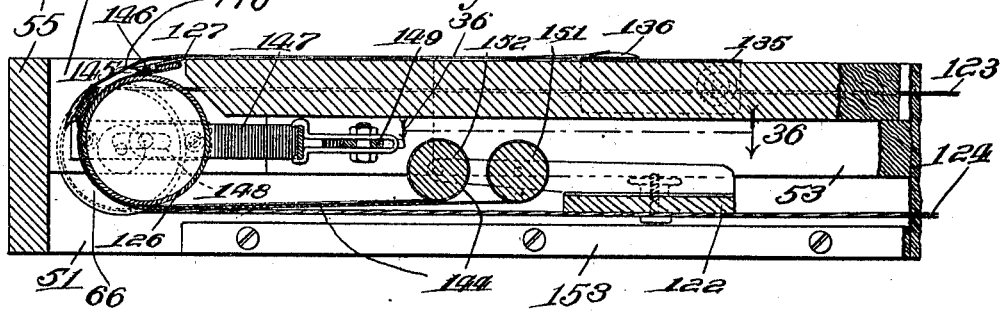
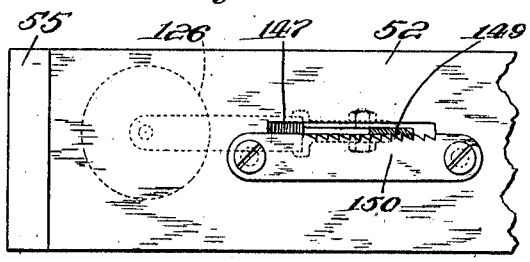
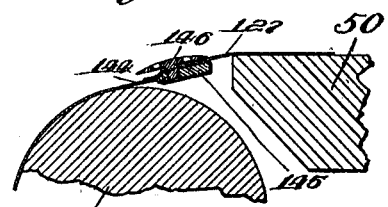
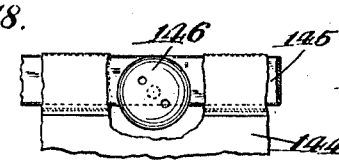
WITNESSES:
INVENTOR: Charles H. Little
by his attorney

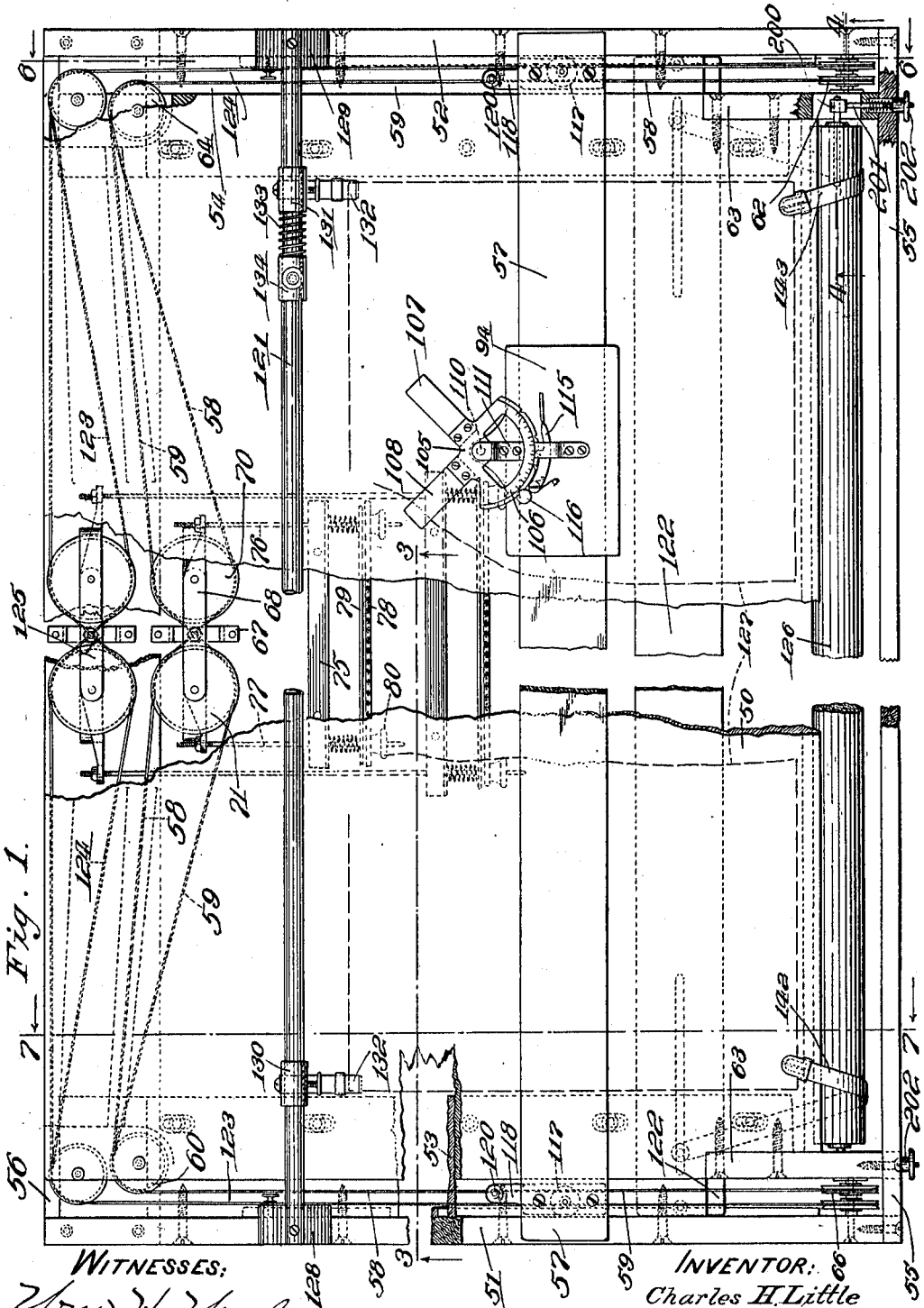

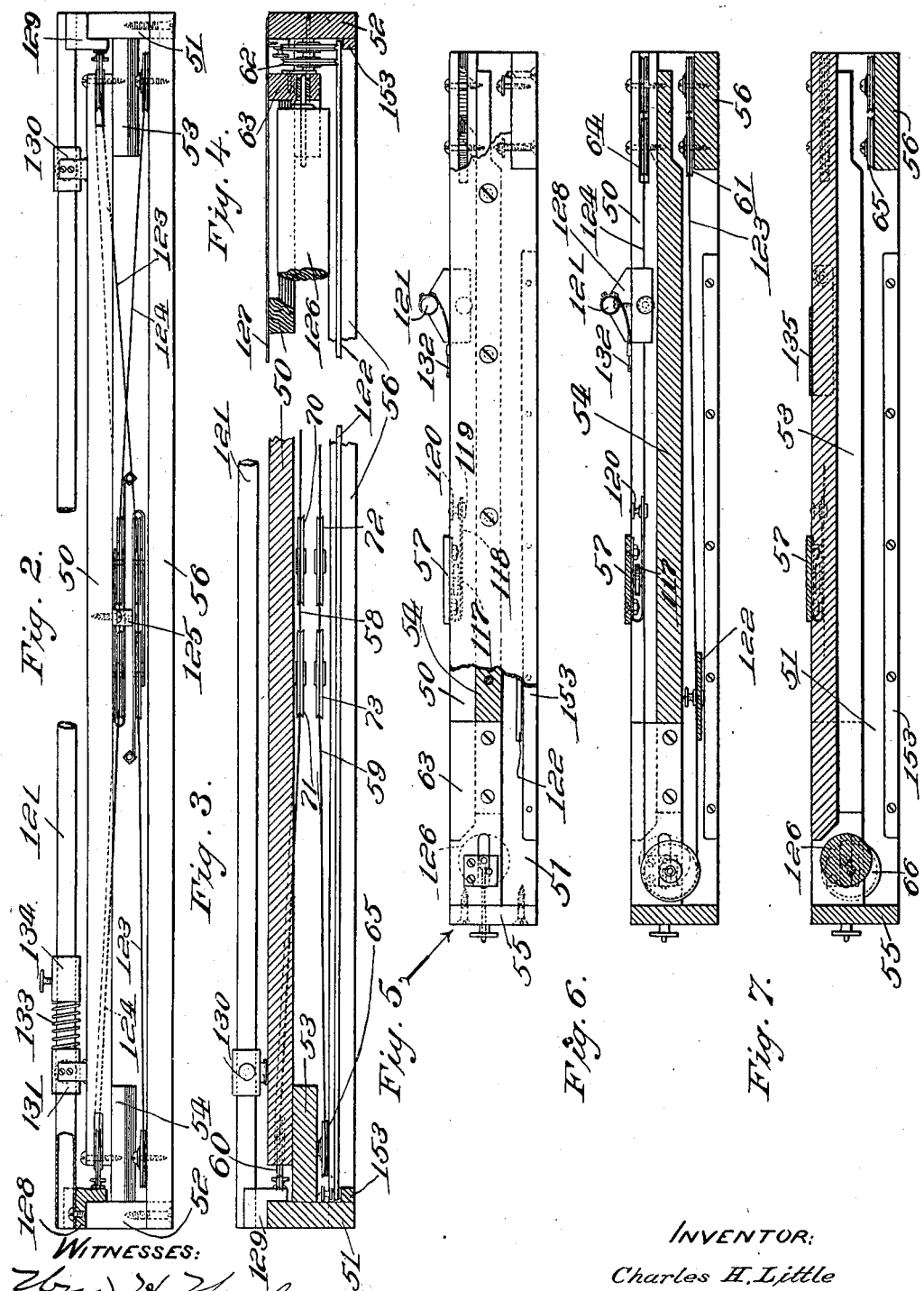

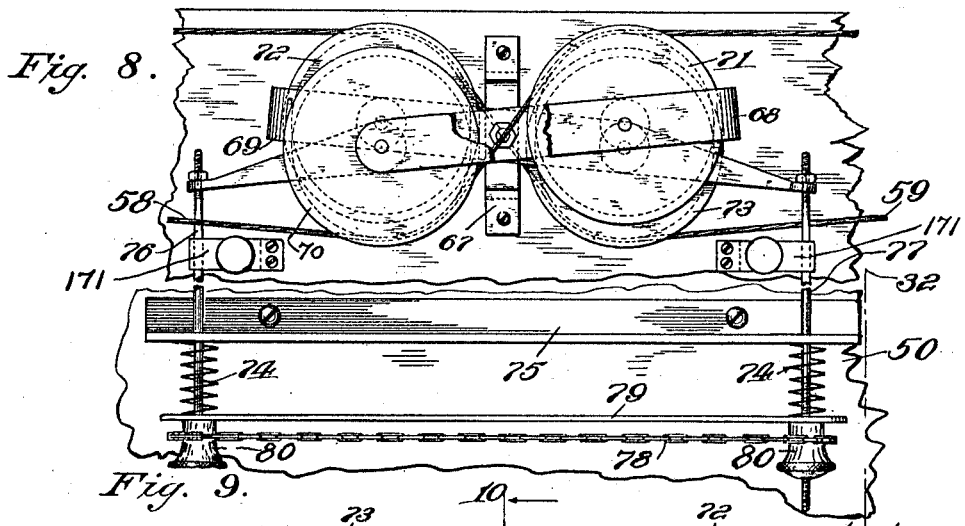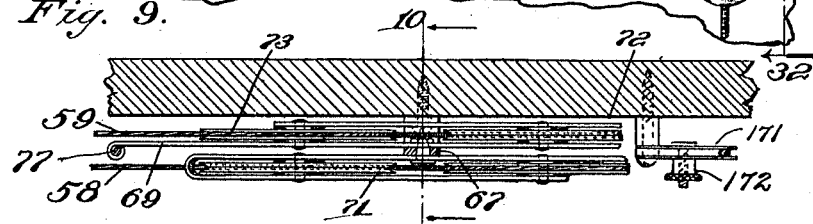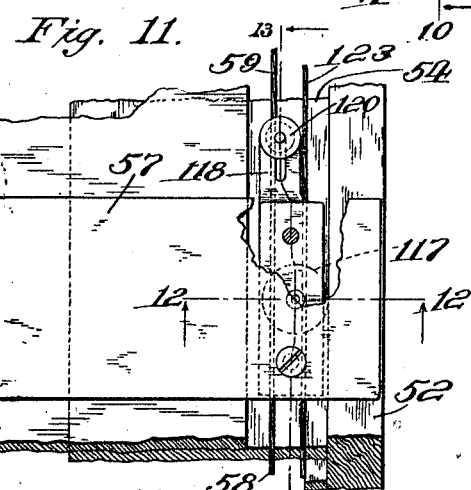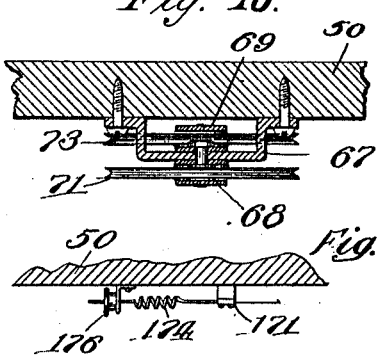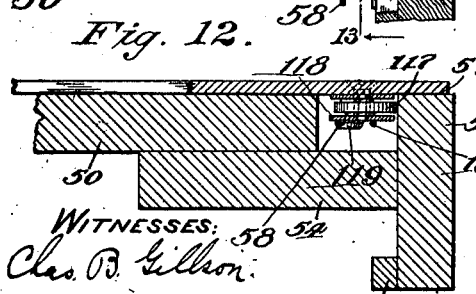

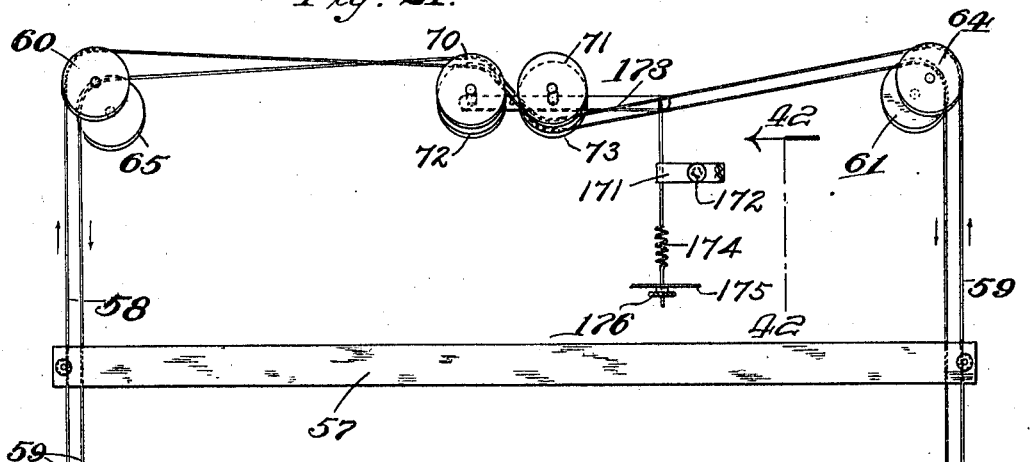
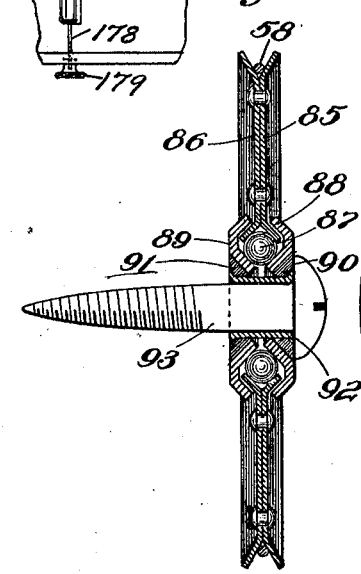
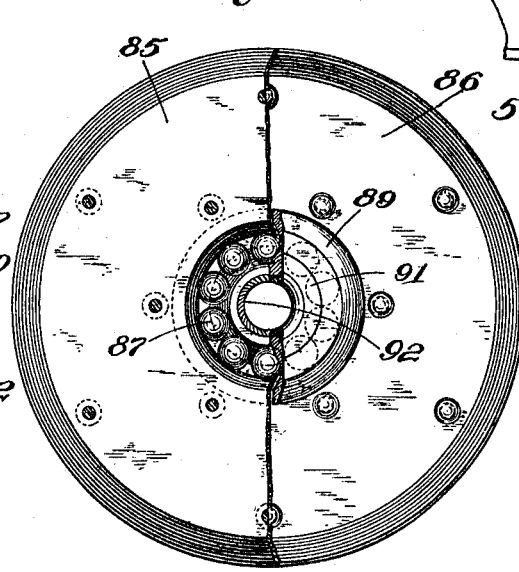

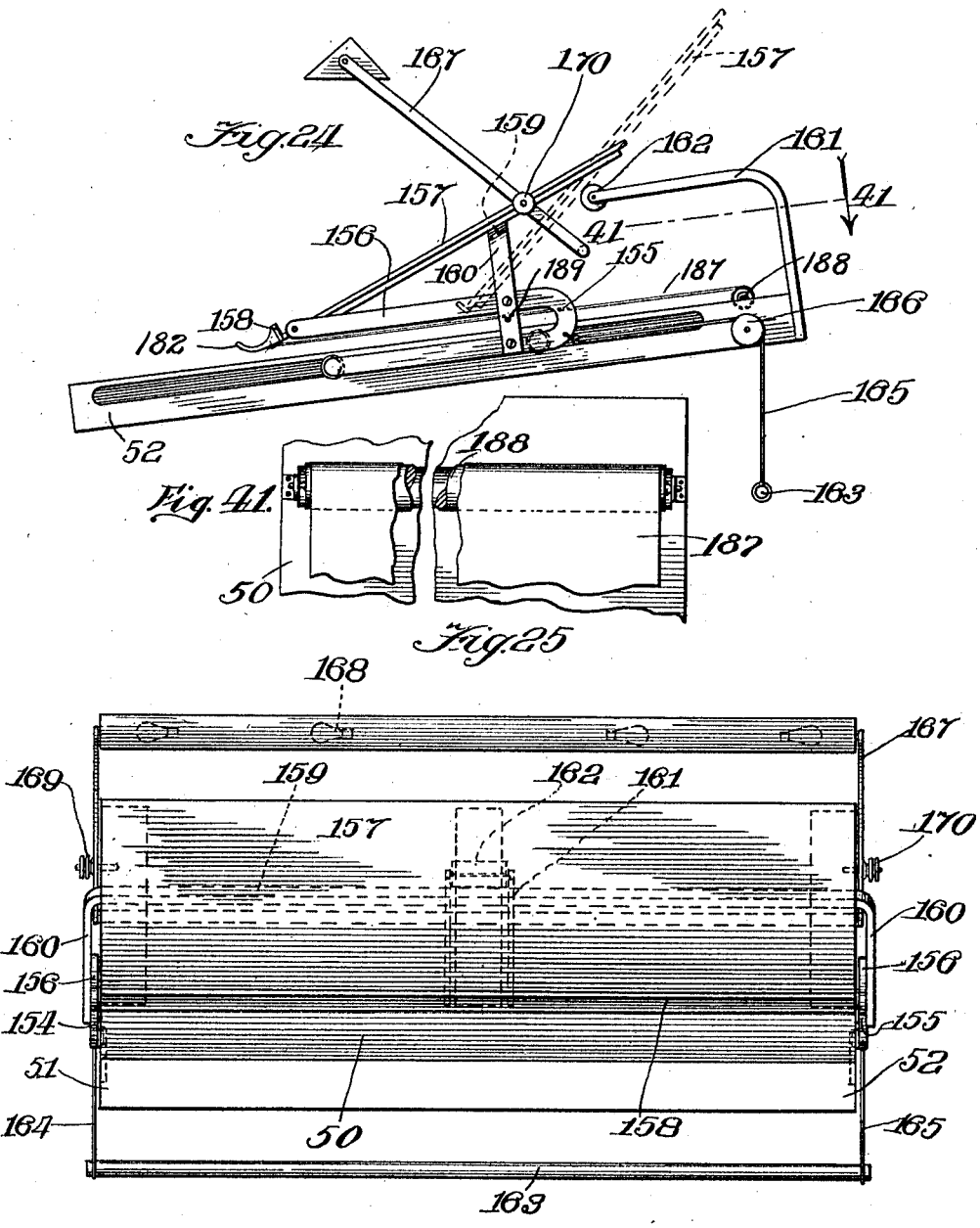

C. H. LITTLE.
DRAFTING MACHINE.
APPLICATION FILED FEB. 10, 1905.
1,003,766.
Patented Sept. 19, 1911.
8 SHEETS—SHEET 7.
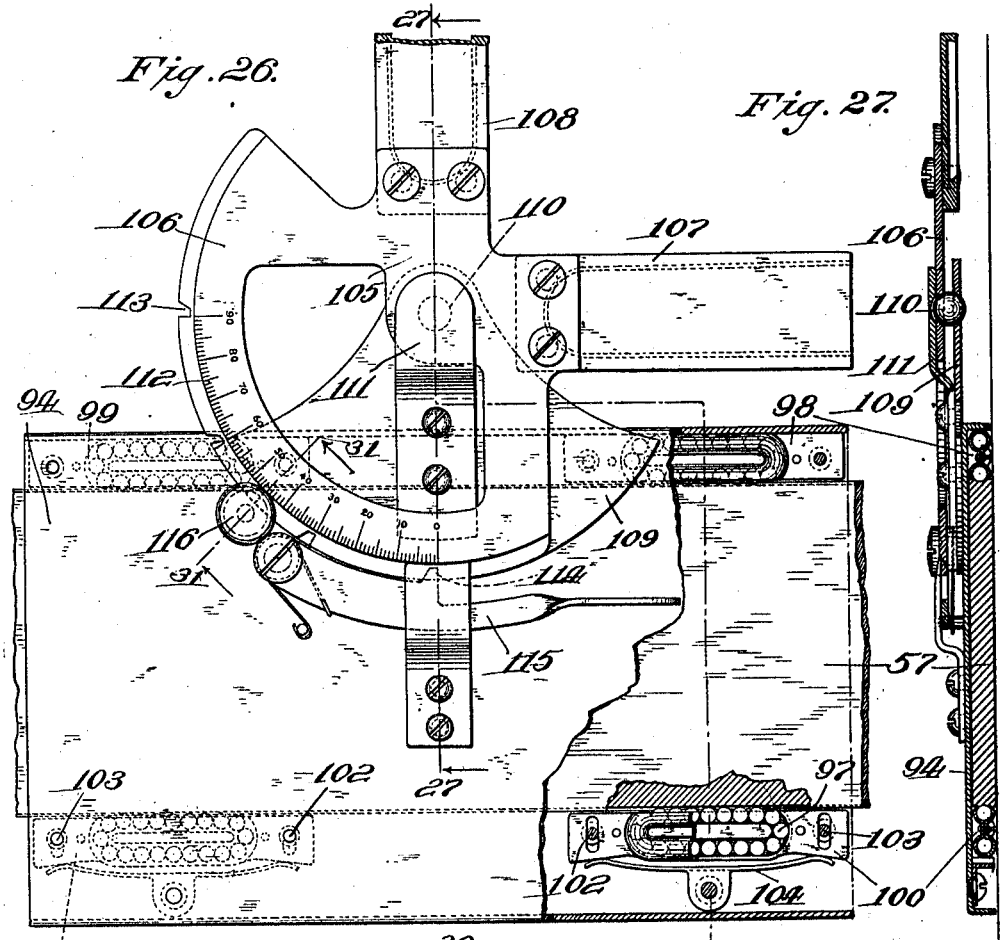
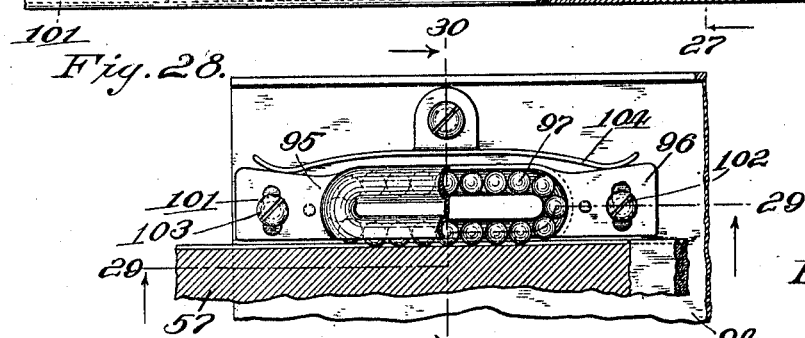
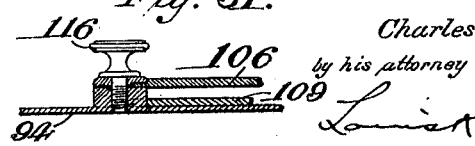
WITNESSES:
INVENTOR:
Charles H. Little
by his attorney

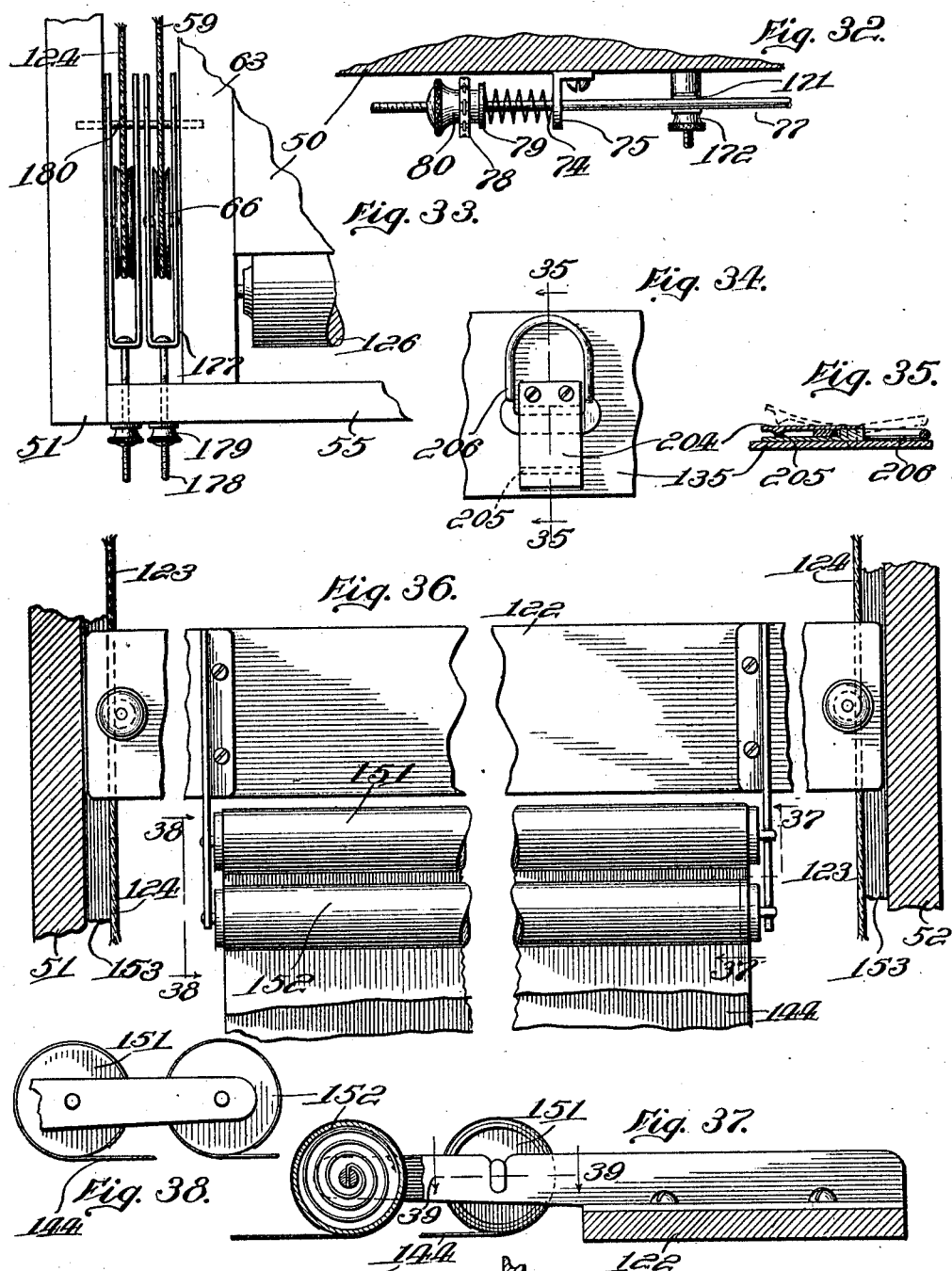

UNITED STATES PATENT OFFICE.

CHARLES H. LITTLE, OF CLEVELAND, OHIO.

DRAFTING-MACHINE.

1,003,766.   Specification of Letters Patent.   Patented Sept. 19, 1911.

Application filed February 10, 1905. Serial No. 245,075.

*To all whom it may concern:*

Be it known that I, CHARLES H. LITTLE, a citizen of the United States, and resident of Cleveland, county of Cuyahoga, and State of Ohio, have invented certain new and useful Improvements in Drafting-Machines, of which the following is a specification, and which are illustrated in the accompanying drawings, forming a part thereof.

This invention relates to a parallel ruler drafting machine; its objects being to provide an accurate machine of this character comprising a drawing board carrying a laterally movable ruler or bar, maintained parallel with one edge of the board and carrying a traveler, upon which is mounted a drafting instrument whereby the instrument may have a universal movement over the board with a constant angular relation thereto; to provide for shifting the paper on the board; and to provide a movable reference table.

The invention has further minor objects which will be pointed out in the specification.

The invention consists in the mechanism hereinafter described, and which is illustrated in the accompanying drawings, in which—

Figure 1 is a detail plan of a drawing board and the preferred form of supporting frame therefor, with some portions broken away and in section; Fig. 2 is a rear elevation of the drawing table and its supporting frame, partly in section and some parts being broken away; Fig. 3 is a detail longitudinal section on the line 3—3 of Fig. 1; Fig. 4 is a similar section on the line 4—4 of Fig. 1; Fig. 5 is an end elevation of the board with parts broken away and some parts removed; Figs. 6 and 7 are transverse sections of the board on the lines 6—6 and 7—7, respectively, of Fig. 1; Fig. 8 is an enlarged inverted detail of the board, showing one form of cord tensioning device; Fig. 9 is a detail section of the same, but inverted; Fig. 10 is a detail section on the line 10—10 of Fig. 9; Fig. 11 is a detail plan view of a portion of the board and its appurtenances; Fig. 12 is a detail section on the lines 12—12 of Figs. 11 and 13; Fig. 13 is a detail section on the line 13—13 of Fig. 11; Fig. 14 is a detail plan view of a portion of the board and its supporting frame, partly in section, showing modifications; Fig. 15 is a detail section of the same on the line 15—15 of Fig. 14, with some parts added; Fig. 16 is a detail side elevation of a portion of the supporting frame, on an enlarged scale; Fig. 17 is an enlarged sectional detail of the board and appurtenances; Fig. 18 is a detail plan of one form of sheet holding device; Fig. 19 is an inverted face view of one form of sheet holding clamp; Fig. 20 is a section of the same, showing its application to the bar; Fig. 21 is a diagrammatic view of one form of the ruler-carrying mechanism; Figs. 22 and 23 are details of the preferred form of guide sheave; Figs. 24 and 25 are details of the drawing board with the reference table attached, showing, respectively, a side and front elevation; Fig. 26 is a detail of a traveler head, etc., and drafting instrument as applied to the board; Fig. 27 is a section on the double line 27—27 of Fig. 26; Fig. 28 is an inverted detail on an enlarged scale, partly in section, of the traveler head and its support; Fig. 29 is a detail section, partly in elevation, on the line 29—29 of Fig. 28; Fig. 30 is a detail section, not inverted, on the line 30—30 of Fig. 28; Fig. 31 is a detail section on the line 31—31 of Fig. 26; Fig. 32 is a detail section on the line 32—32 of Fig. 8; Fig. 33 is a detail of Fig. 14, showing a modification in the construction; Fig. 34 is a detail plan of another form of sheet holding device; Fig. 35 is a detail section on the line 35—35 of Fig. 34; Fig. 36 is a detail section on the line 36—36 of Fig. 15; Fig. 37 is a detail section on the line 37—37 of Fig. 36; Fig. 38 is a detail elevation as viewed from the line 38—38 of Fig. 36; Fig. 39 is a detail section on the line 39—39 of Fig. 37; Fig. 40 is a detail section on the line 40—40 of Fig. 14; Fig. 41 is a detail plan as viewed from the line 41—41 of Fig. 24; and Fig. 42 is a detail section on the line 42—42 of Fig. 21.

The machine comprises a drafting board 50, of any desired size, and provided with side bars 51, 52, spaced apart from its edges and carried by the cleats 53, 54, secured to its under face and projecting beyond its side edges. These side bars project beyond the front edge of the board and carry at their forward ends a rail 55. The side bars 51 and 52 are united at their rearward ends by a cross-bar 56, below the plane of the board 50. A ruler bar 57 lies across the face of the board and is carried by the cord sections 58, 59, each leading from opposite sides of the bar 57 near its ends, and turning over suitable sheaves. The cord section 58, leading backwardly from the left end of the ruler bar 57, turns over a sheave 60, at the upper left-hand corner of the machine, and journaled in horizontal plane on the board and cleat 53, and thence to a sheave 61, at the upper right-hand corner of the machine, journaled on the cross-bar 56, and thence forwardly to a sheave 62, journaled in vertical plane between the side bar 52 and a bar 63 set into a suitable recess in the forward corner of the board 50, and projecting forwardly to the front rail 55. Turning over the sheave 62 the cord section 58 leads to the forward side of the right-hand end of the bar 57. The cord section 59, leading backwardly from the right-hand end of the bar 57, turns over a sheave 64, journaled in horizontal plane on the board and cleat 54, at the upper right-hand corner of the machine, and thence to a sheave 65, journaled on the cross-bar 56 at the upper left-hand corner of the machine, and thence forwardly to a sheave 66 located at the front left-hand corner of the machine and journaled similarly to the sheave 62, the cord leading thence to the left end of the bar 57. The two cord sections 58 and 59 thus in effect constitute an endless cord, all portions of which, leading from the bar 57 to an adjacent sheave, always move in the same direction, with view to maintaining a uniform angular relation of the bar to the board. In order to secure accuracy the cord must be of a material that is substantially non-stretching under the tension added to it by any working movement of the bar; or, in other words, it must be of a material having a high modulus of elasticity, such as brass, steel, etc. Such a cord will rigidly hold the ruler bar against displacement by pressure applied to it, as by the ruling of a line, while the draftsman anchors it at one end with his hand.

As shown in Figs. 1, 3 and 8 of the drawings, the cord sections 58, 59, are drawn taut by a straining device located below the board 50 and between the sheaves at its upper corners, and carried by a bracket 67, in loop form, secured to the under side of the board 50. This straining device comprises a pair of levers 68, 69, fulcrumed on the bracket 67, and each carrying a pair of sheaves 70, 71 and 72, 73, mounted on opposite sides of its pivot, each of the cord sections engaging diametrically opposite rim faces of the members of each pair of sheaves, so that the oscillation of the levers 68, 69, deflects the cord sections more or less from a straight line and thus controls their tension. The levers 68 and 69 are controlled by links 76 and 77, each inclosed by a spring 74, reacting between a set nut 80 on the link, and a bracket 75, secured to the under face of the board 50. A sprocket chain 78 turns over sprocket wheels formed on the shank of each of the set nuts 80 and insures their turning together, so that an equal adjustment of the pressure on each of the springs 74 may be made. A spacing bar 79, apertured adjacent its ends to receive the links 76 and 77, is employed for keeping the sprocket chain taut. A friction device, comprising a pair of spring plates 171 secured to the board and adjustably drawn together by a thumb-screw 172, bears against each link 76, 77, to prevent the yielding of the springs 74 under the influence of sudden strain applied to the cord in moving the bar 57. The straining device described is thus applied directly and uniformly to both of the cord sections, thus taking up any slack in the cord without disturbing the angular position of the bar 57.

A modification of the take up is shown in Fig. 21, in which the sheaves 70, 71, 72, 73 are all mounted on a single bar 173, which is pivoted between the two sets of sheaves and stress the cord by means of the rod and spring 174. This stress may be adjusted by means of the thumb-nut 176, acting against the support 175. The friction spring 171 and thumb-nut 172 for adjusting the same act on the rod 174 to prevent the yielding of the spring within desired limits.

Preferably the sheaves 62, 66, at the forward corners of the board are journaled in adjustable frames 177, slidable upon guide pins 180, set in the end of the board and the adjacent side rail 51 or 52. Each frame 177 is controlled by a threaded stem 178, extending through the front rail 55, and carrying a thumb-nut 179. This mechanism provides means for conveniently regulating the tension of the cord, and truing up the bar 57. Indeed, it may be relied on, if desired, in lieu of the automatic straining devices described.

While the cord for carrying the ruler bar must be substantially non-stretching, it is also important that it have a high degree of flexibility to the end that it may easily turn about the several sheaves; and to that end I prefer to use a cord made up of a plurality of strands twisted or braided together, as shown in detail in Fig. 33. The use of a cord of the character just described implies that it be drawn sufficiently taut to eliminate any give due to the cord not being perfectly straight. Accuracy, with reasonable speed in working, is impossible unless the parts of the machine move with extreme ease. To this end it is essential that the friction of the sheaves be minimized. Those over which the cord sections turn are of unique construction in devices of this character, in that they are provided with ball bearings; and they are further of peculiar construction, as illustrated in detail in Figs. 22 and 23. Each of the sheaves is formed of a pair of annular plates 85, 86, securely riveted together, as shown, and flaring outwardly at their rims and also at their internal edges to form channels for the cord, as 58, and for the balls upon which they run, as 87. The blocks 88, 89, comprising the ball race, are stamped out of sheet metal and are annular in form, and preferably extend beyond the inner flaring flanges of the plates 85, 86, and are inclined inwardly at their rims and also at their inner edges. A pair of rings 90, 91, are fitted against the inner inclined portions of the plates 88, 89, and a rivet 92, preferably tubular in form, is fitted within these rings and the central apertures of the plates.

In assembling the parts of the sheave the wheel portion is first given its described form; the balls 87 are then inserted within its inner channel; the rivet 92 is peened at one end, one of the rings, as 91, and the adjacent plate 89 is then fitted upon the rivet, the sheave with the balls is adjusted in place, the remaining plate, as 88, and ring, as 90, are then placed in position, and the end of the rivet over which the parts have been slipped is now peened to bring the plates 88, 89 to a bearing against the balls with such pressure as may be desired. The sheave is now completed, and may be attached by any suitable means, as a wood screw 93 setting through the tubular rivet. The bowed portions of the plates 88, 89, project beyond the flaring edges of the sheave, providing a suitable seat, when thus secured against a flat surface, leaving the rim of the sheave free to turn.

A traveler 94 runs upon the ruler bar 57, and is preferably formed of a plate of sheet metal, to the under face of which bearing blocks are secured for engaging the sides of the bar. These bearing blocks are shown as each formed of two plates of sheet metal 95, 96, each stamped to form an oblong channel, the two plates being securely riveted together and their channels coinciding to form a race for a set of balls 97. The ball race opens through the inner edge of the block sufficiently to allow the balls to protrude therefrom to take a bearing against the edge of the bar 57, and the latter is longitudinally grooved to provide ways for these several sets of balls, thus insuring the traveler against easy accidental displacement from the bar, and also preventing the wear of the outer edge of the bar, which is frequently used for ruling purposes. One pair of the bearing blocks, as 98, 99, is securely riveted to the plate 94, and the other pair, as 100, 101, is transversely slotted for the engagement of pins, as 102, 103, projecting downwardly from the plate 94, each of the blocks being pressed forwardly against the bar 57 by a spring 104. The traveler is easily applied and removed by the application of lateral pressure to compress the springs 104 and by raising its opposite side.

Any suitable drafting instrument, such as the protractor 105, is mounted upon the traveler 94. The protractor comprises the segmental plate 106, carrying the chuck plates 107, 108, for receiving the rulers, and pivoted upon the base plate 109, secured to the plate 94, by means of a ball pivot 110, set within apertures in the plates 106, 109, and clamping plate 111, secured to the base plate 109, bearing upon the plate 106 by spring pressure to hold it against the ball pivot. The plate 106 is provided with a scale 112, and its periphery is notched, as shown at 113, for the engagement of a point 114, carried by a spring arm 115, the notches being arranged to correspond with the more commonly used angles. A binding screw 116, set into the plate 94, overlaps the edge of the plate 106 and provides means for locking the latter in any angular position.

While the traveler, provided, as it is, with ball bearings, runs freely upon the bar 57, there is, of course, sufficient friction to cause some longitudinal movement of the latter bar, and this movement is restricted by means of a roller 117 (shown in detail in Figs. 12 and 13), carried by a pin projecting downwardly from the bar 57 adjacent its end, the roller being adapted to bear against either the edge of the board 50 or the inner face of the side rail 51 or 52. If desired two of these rollers are provided, one at each end of the bar 57, shown in dotted lines in Fig. 1.

The attachment of the cord sections to the bar 57 is by means of a plate 118, secured to the under face of the bar, and a binding screw 119, set through a slot in the plate, and a nut 120 applied to the threaded end of the screw, all being located below the plane of the upper surface of the bar, thereby providing for its unobstructed use as a carrier for the traveler to its extreme ends, and providing also for a suitable adjustment of the bar relatively to the cord.

Means is provided for adjustably securing a sheet of drawing material, such as paper or linen, to the surface of the board, and comprises a pair of bars, such as 121 and 122, located one above and the other below the drawing board and carried by cord sections 123, 124, mounted and arranged in all respects similar to the cord sections 58, 59, already described, and provided, also, if desired, with a similar tensioning device, as represented at 125 in Fig.

1, whereby the two bars are capable of lateral movement, always moving together and in opposite directions. The sheaves at the forward corners of the board over which the cord sections 123, 124 turn, are also preferably mounted in adjustable frames, as shown, the same as the devices already described, for carrying and straining the cord sections carrying the ruler bar 57. A roller 126, suitably journaled between the front edge of the drawing board 50 and the front rail 55 of its frame, guides the drawing sheet 127, or the apron or straps to which its front edge is secured, as hereinafter described.

In the construction shown in Figs. 1 to 6, the bar 121, to which the upper edge of the drawing sheet is secured, is provided with bearing blocks 128, 129, which run on the side bars 51, 52, of the frame of the drawing board, and with adjustable clamping blocks 130, 131, each carrying a pair of clamping fingers 132 for engaging the drawing sheet. In order to prevent the sheet from wrinkling one of the blocks, as 131, is seated against an expansion spring 133, which reacts against a block 134, adjustably mounted upon the rod 121.

Preferably in lieu of the rod 121 there is employed a thin sheet metal bar 135, as shown in Figs. 7, 14, 15 and 20, which forms no obstruction to the drawing instruments and the drawing sheet. The drawing sheet 127 is secured to this bar by means of circular clamping plates 136, each having a central threaded aperture to engage a threaded stud 137, projecting upwardly from a square head 138, seated in a suitable socket in the bar; the plate 136 being also provided with sockets, as 139, for the engagement of a special form of wrench, not shown. The under face of each of the plates 136 is provided with one or more depending circular ribs 140, brought to a knife edge in order that it may indent and securely grip the drawing sheet as the plate is screwed down. If desired the head 138 may be seated in a longitudinal slot, as shown at 141, that it may be adjusted longitudinally as to the bar 135.

A clip 204, shown in detail in Figs. 34 and 35, may be substituted for the clamping plates 136. This clip is formed preferably of spring metal, being secured at its rear edge to the bar 135 and provided near its forward edge with a jaw 205 for gripping the drawing sheet. A flattened ring 206 rests upon the bar 135 and passes beneath the clip, which it raises by a cam action to release the sheet when tilted, as in the dotted lines position of Fig. 35.

As shown in Fig. 1 the front edge of the drawing sheet is secured by means of straps 142, 143, leading forwardly from the bar 122, and adjustable longitudinally thereupon in order to accommodate drawing sheets of varying widths. Preferably the inner ends of the straps 142 and 143 are farther apart than the width of the drawing sheet, in order that there may be lateral strain applied to the latter for the purpose of preventing it from wrinkling.

As shown in Figs. 14, 15, 17 and 18, an apron 144 leads forwardly from the bar 122 for the purpose of securing the lower edge of the drafting sheet 127. The forward edge of the apron 144 carries a bar 145, having screw-threaded sockets for the engagement of binding screws having flat heads, as shown at 146, under the edges of which the drawing sheet is securely clamped.

The roller 126 is journaled in a yoke-shaped spring frame 147, its trunnions projecting through and beyond the ends of the frame and entering guide-slots 148 in the bars 63. An adjusting lever 149, pivoted in one of the side bars of the frame, as 51, bears against the bow of the frame 147 and projects through a longitudinal slot in the other side rail, as 52, and coöperates with a ratchet plate 150, whereby the roller 126 may be yieldingly advanced to bring the drawing sheet to a tension after it has been secured, and providing means also for the rocking of the roller 126 to adapt it to irregularities in the form or placing in position of the drawing sheet. A simpler form of adjustment for the roller 126 is illustrated in Fig. 1; the roller being shown as journaled in boxes 200 (but one of which is represented), each provided with a threaded stem 201, extending through the front rail 55 of the frame and carrying an adjusting nut 202, which bears against a spring coiled about the stem, so that the roller is yieldingly held to strain the sheet or sheets turning over it. The nuts 202 are within convenient reach and the roller may be thereby easily adjusted both to strain and true up the sheet.

Obviously two drawing sheets, as a sheet of paper and a sheet of tracing linen, may be mounted together, and if desired they may be independently attached by a mere duplication of the attaching mechanism. As shown in Figs. 15 and 36, there may be carried by the bar 122 a pair of spring rollers 151, 152, each carrying an attaching apron, such as 144, for independently holding two such drawing sheets. At 153 is shown a rail secured to the inner faces of the side rails 51, 52, for supporting the bar 122.

A reference board is adjustably mounted upon the drafting machine, so that it may be drawn forwardly or pushed back out of the way of the instrument. This device is shown in Figs. 24, 25 and 41, wherein the side rails 51, 52, are shown as having longitudinal grooves in their outer faces, within which travel rollers carried by a pair of U-shaped standards 154, 155, one side arm of such standard lying along the groove and the other, 156, projecting forwardly and above the drawing board. To the forward end of the arm 156 is pivotally attached a board 157, having at its lower edge an upstanding stop plate 158. A cross bar 159, carried by standards 160, rising from the standards 154, 155, supports the table 157 when the latter is drawn forward. An instrument tray 182 is attached to the front edge of the reference board 157, and preferably runs the full length of it. A bracket arm 161, rising from the rear cross-bar of the frame of the drawing board, projects forwardly and carries a roller 162, against which the board 157 strikes as it is moved backwardly, by means of which it is raised to the dotted lines position of Fig. 24, thereby bringing the drawing carried by it more plainly into view and economizing space.

A counterweight, in the form of a bar 163, is suspended by means of a pair of cords 164, 165, secured to the rear ends of the standards 154, 155, and turning over pulleys, as 166, secured to the side rails of the frame of the drawing board. A frame 167 rises from the reference table 157 for carrying a series of lamps, as 168, and this frame is secured to the side edges of the table by means of clamping screws 169, 170, whereby it may be adjusted to any suitable position. The counterweight may be supplemented or supplanted by an apron 187, covering the width of the drawing and carried at one end by a spring roller 188, the opposite end being secured to the reference board 157. A rod 189, secured at its ends to the bars 160, keeps the apron from dragging on the drawing. This apron keeps the reference board square with the drawing board and also serves as a covering for the drawing sheet mounted on the latter. If desired the counterweight 163 and corresponding parts may be omitted and the pull exerted by the spring roller on the apron made sufficient to counterbalance the reference board.

The drafting machine herein shown and described provides a practical and accurate means for utilizing the so-called parallel ruler movement, whereby a carrying bar, upon which may run an instrument-carrying traveler, is so mounted over the board that it may be moved laterally without disturbing its angular relation thereto. In instruments of this kind it has heretofore been found practically impossible to secure accuracy, for the reason that the friction of the rollers or sheaves upon which the cord has run has exceeded the coefficient of stretch of the cord. The carrying bar or ruler member might sometimes be moved by a pressure midway of its ends without throwing it out of position, but the application of pressure at any other point would stretch the cord so as to change the angular position of the bar. If the cord were slackened in order to reduce the friction the inaccuracy would be increased. If the cord were tightened the friction would be so greatly increased as to render it impossible to quickly move the ruler bar to any desired position with accuracy. In the machine organized as herein shown and described the coefficiency of friction is so small that a cord may readily be employed having a less coefficiency of stretch, and hence there is no danger of changing the angular position of the carrying bar relatively to the board. Drawing machines of this type have also been unsatisfactory because of the shrinking and swelling of the board and variation in length of the cord due to atmospheric conditions, thus varying the tension on the cords. The straining device herein shown and described maintains a substantially uniform strain on the cord, whatever may be the state of the atmosphere, and being applied to both sections of the cord any slack is taken up without disturbing the angular position of the carrier bar.

The traveler shown and described moves with such ease that it may be quickly and accurately adjusted to any desired position.

It is obvious that a draftsman may do his work most expeditiously and accurately, as well as more comfortably and with less injury to his health, on the fore part of the drawing board, and to this end the adjustability of the drawing sheet is of great importance. The mechanism for securing the sheet is as readily moved as is the carrier bar; the sheet is always held securely and drawn taut, and may be moved back and forth without being rolled or in any wise injured.

The usual practice heretofore has been to locate the reference table at the side of the drawing machine, thus practically doubling the floor space required, an item of very great importance where a considerable number of draftsmen are employed, and especially where the work involves material variations in the number of drafting machines used. In the machine herein described the reference table or board is applied without materially increasing the area of floor space covered by the machine; and furthermore, it is located in such position as to be viewed by the draftsman from his working position, and is readily drawn toward him for close study and the taking of measurements without interfering with his implements.

The peculiar form of sheaves shown and described for carrying the various cords are at once simple and cheap of construction, and exceedingly durable and true; conditions, coupled with the other various advantages of the board, which render it a thoroughly practical machine of the type described.

I claim as my invention—

1. In combination, a drafting board; two pairs of sheaves mounted on the board and arranged parallel with opposite sides thereof; a bar movable over the board; two cord sections each running over one sheave of each pair of sheaves and being attached to opposite edges of the bar; and a straining device yielding within certain limits acting directly on each cord section.

2. In combination, a drafting board; two pairs of sheaves arranged on parallel lines; a bar movable over the board; two cord sections, each running over one sheave of each pair and being attached to opposite edges of the bar; and a straining device adapted to yield outside of desired limits acting directly on each cord section.

3. In combination, a drafting board; two pairs of sheaves arranged on parallel lines; a bar movable over the board; two cord sections, each running over one sheave of each pair and being attached to opposite edges of the bar; and a straining device comprising a rock bar acting on both cord sections intermediate of the pairs of sheaves to deflect them from a straight line, and a spring for moving the rock bar.

4. In combination, a drawing board, an endless cord running on sheaves mounted with the board and arranged to locate two similarly traveling turns of the cord one at each end of the board, one stretch of each turn being above and the other below the board, paper-holding means secured, respectively, to the upper and lower stretches of the cord.

5. In combination, a drafting board; two pairs of sheaves mounted on the board arranged parallel with opposite sides thereof; an endless taut cord running on the sheaves and being crossed between the two pairs of sheaves; a bar; a slotted plate attached to the bar near each end thereof; a clamping member for engaging the cord and adjustably secured within the slot of each plate; and a roller carried by each plate for engaging the edge of the board.

6. In combination, a drafting board; sheaves mounted on the board and arranged in parallel sets; an endless cord running on the sheaves; a pair of sheet-holding bars one above and one below the board and having their ends secured to parallel sections of the cord; and a roller adjustably journaled at one edge of the board.

7. In combination, a drafting board; two pairs of sheaves mounted on the board arranged parallel with opposite sides thereof; an endless taut cord running on the sheaves and being crossed between the two pairs of sheaves; a bar secured to the cord between the members of each pair of sheaves; a traveler running on the bar and having spring-supported bearing blocks engaging the edge thereof, each block having a continuous ball race and anti-friction balls running therein for engaging the edge of the bar; and a drafting instrument carried by the traveler.

8. In combination, a drafting board; two pairs of sheaves mounted on the board arranged parallel with opposite sides thereof; an endless taut cord running on the sheaves and being crossed between the two pairs of sheaves; a bar secured to the cord between the members of each pair of sheaves and having its side edges grooved; a traveler running on the bar and having spring-supported bearing blocks engaging the edge thereof, each block having a continuous ball race and anti-friction balls running therein for engaging the groove in the bar; and a drafting instrument carried by the traveler.

9. In combination, a drafting board; two pairs of sheaves mounted on the board arranged parallel with opposite sides thereof; an endless taut cord running on the sheaves and being crossed between the two pairs of sheaves; a bar secured to the cord between the members of each pair of sheaves; a traveler running on the bar; a protractor pivoted to the traveler, its pivot comprising a ball seated in a recess in each member; and a spring arm secured to the traveler and bearing the protractor against the ball.

10. In combination, a drafting ruler or bar; a traveler running on the ruler or bar and having bearing blocks engaging the sides thereof, one of such blocks being spring-advanced, each block containing a continuous ball race open through the face of the blocks to allow the balls to protrude.

11. In combination, a drafting board; sheaves mounted on the board in parallel sets; an endless cord running on the sheaves; and a plurality of sheet holding bars having their ends secured to parallel stretches of the cord.

12. In combination, a drafting board; sheaves mounted on the board and arranged in parallel sets; an endless cord running on the sheaves; a pair of sheet holding bars one above and one below the board and having their ends secured to parallel stretches of the cord; and a roller journaled at one edge of the board.

13. In combination, a drafting board; sheaves mounted on the board and arranged in parallel sets; an endless cord running on the sheaves; a pair of sheet holding bars mounted one above and one below the board and having their ends secured to parallel stretches of the cord; a roller journaled at one edge of the board in spring-advanced sliding boxes.

14. In combination, a drafting board; sheaves mounted on the board and arranged in parallel sets; an endless cord running on the sheaves; a pair of sheet holding bars mounted one above and one below the board and having their ends secured to parallel stretches of the cord; an apron attached to one of the bars to which the sheet may be secured; and a roller journaled at one edge of the board for guiding the apron.

15. In combination, a drafting board; sheaves mounted on the board and arranged in parallel sets; an endless cord running on the sheaves; a pair of sheet holding bars mounted one above and one below the board and having their ends secured to parallel stretches of the cord; a roller journaled at one edge of the board in a movable frame; and a lever bearing centrally on the frame.

16. In combination, a drafting board; a laterally movable sheet carrying bar mounted on the board; a rotatable clamping plate having a depending annular flange, and a threaded stem connecting the plate and bar.

17. In combination, a drafting board; a laterally movable sheet carrying bar mounted on the board; a rotatable clamping plate having a depending annular flange; and a threaded stem projecting upwardly through the bar and having an angular head countersunk into the bar, the stem engaging the clamping plate.

18. In combination, a drafting board; sheaves mounted on the board in two parallel sets; an endless cord running on the sheaves; a sheet carrying bar secured to parallel stretches of the cord; and means cooperating with the bar for maintaining the sheet taut.

19. In combination, a drafting board; sheaves mounted on the board and arranged in parallel sets; an endless cord running on the sheaves; and a pair of sheet metal bars one above and one below the board and having their ends secured to parallel stretches of the cord; a guide roller adjustably journaled at one edge of the board; and means for securing the journals in their adjusted position.

20. In combination, a drafting board having ways along its side edges; supports running in the ways and rising above the board; a reference table or frame pivoted to the supports; a lamp-carrying arm pivoted to and projecting above the table; variable means for applying friction to impede the movement of the arm; and a counterweight for the table and its accessories.

21. In combination, a drafting board having ways along its side edges; U-shaped supports each having one arm engaged with and movable along the ways and its other arm above the surface of the board and projecting forwardly; and a reference table or frame carried by the upper arms of the supports.

22. In combination, a drafting board having ways along its side edges; supporting standards engaging and movable along the ways and having upwardly and forwardly projecting arms; and a reference table or frame carried by such arms.

23. In combination, a drafting board having ways along its side edges; supporting standards engaging and movable along the ways and having upwardly and forwardly projecting arms; a reference table or frame pivotally secured to the front ends of such arms, and a stop for limiting the downward movement of the rear end of the table.

24. In combination, a drafting board having ways along its side edges; supporting standards engaging and movable along the ways and having upwardly and forwardly projecting arms; a reference table or frame pivotally secured to the front ends of such arms; and a stop for limiting the downward movement of the rear end of the table.

25. In combination, a drafting board having ways along its side edges; supporting standards engaging and movable along the ways and having upwardly and forwardly projecting arms; a reference table or frame carried by such arms; and a fixed member behind and projecting into the path of the table.

26. In combination, a drafting board having ways along its side edges; supporting standards engaging and movable along the ways and having upwardly and forwardly projecting arms; a reference table or frame pivotally secured to the front ends of such arms; and a stop for limiting the downward movement of the rear end of the table.

27. In combination, a drafting board having ways along its side edges; supporting standards engaging and movable along the ways and having upwardly and forwardly projecting arms; a reference table or frame carried by such arms; and means for tilting the table upwardly as it moves backward.

28. In combination, a drafting board having ways along its side edges; supports running in the ways and rising above the board; a reference table or frame pivoted to the supports; and a lamp-carrying arm projecting upwardly from the table.

29. In combination, a drafting board having ways along its side edges; supports running in the ways and rising above the board; a reference table or frame pivoted to the supports; a lamp-carrying arm pivoted to and projecting above the table; and a counterweight for the table and its accessories.

30. In combination, a substantially horizontal drawing board; a traveling carriage mounted with the board; and a reference carrying frame mounted on the carriage.

31. In combination, a drawing board; a traveling reference carrying frame movable over the board; and a spring for retracting the frame.

32. In combination, a drawing board; a traveling reference carrying frame movable over the board; a spring roller for retracting the frame; and an apron connecting the frame and roller.

33. In combination, a drawing board; a traveling reference carrying frame movable over the board; a spring roller for retracting the frame; and an apron connecting the frame and roller and being attached to the front of the frame.

34. In combination, a drawing board; a traveling reference carrying frame mounted above the table; and means for changing the angle of the frame as it travels.

35. A drafting machine comprising, in combination, a drawing board; a parallel ruler member permanently mounted above the board laterally movable over the board; a paper-shifting device; and a traveling reference carrying frame permanently mounted above the board movable over the board.

36. In combination, a drawing board, an endless cord running on sheaves mounted with the board and arranged to locate two similarly traveling turns of the cord one at each end of the board, one stretch of each turn being above and the other below the board, paper-holding means secured, respectively, to the upper and lower stretches, one of such means being adjustable on the cord.

CHARLES H. LITTLE.

Witnesses:
JACOB GOLDBERGER,
J. H. SALTSMAN.

---

Copies of this patent may be obtained for five cents each, by addressing the "Commissioner of Patents, Washington, D. C."